(No Model.) 2 Sheets—Sheet 1.
J. C. TIFFANY.
DIVISION MAT FOR OIL PRESSES.
No. 275,961. Patented Apr. 17, 1883.
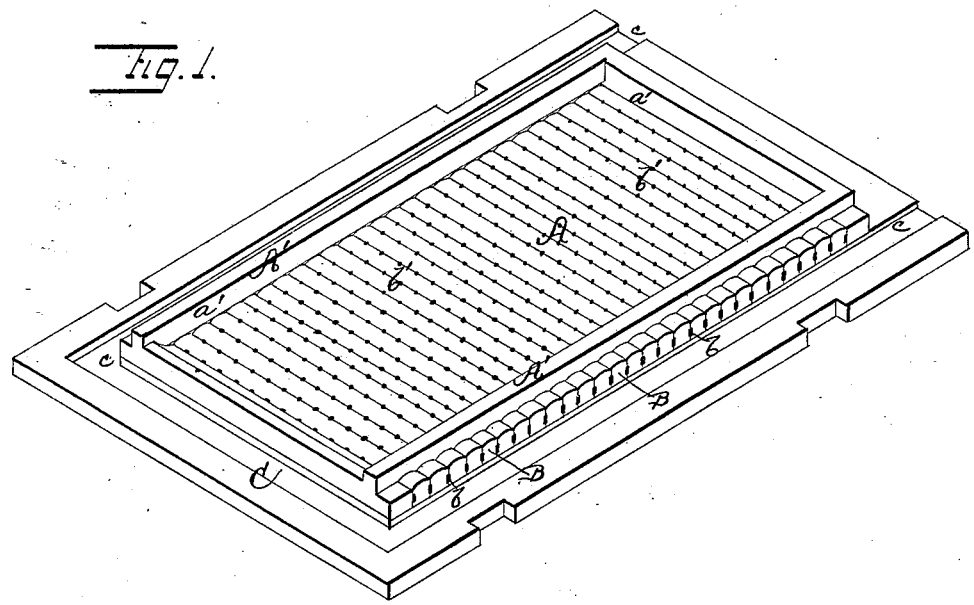
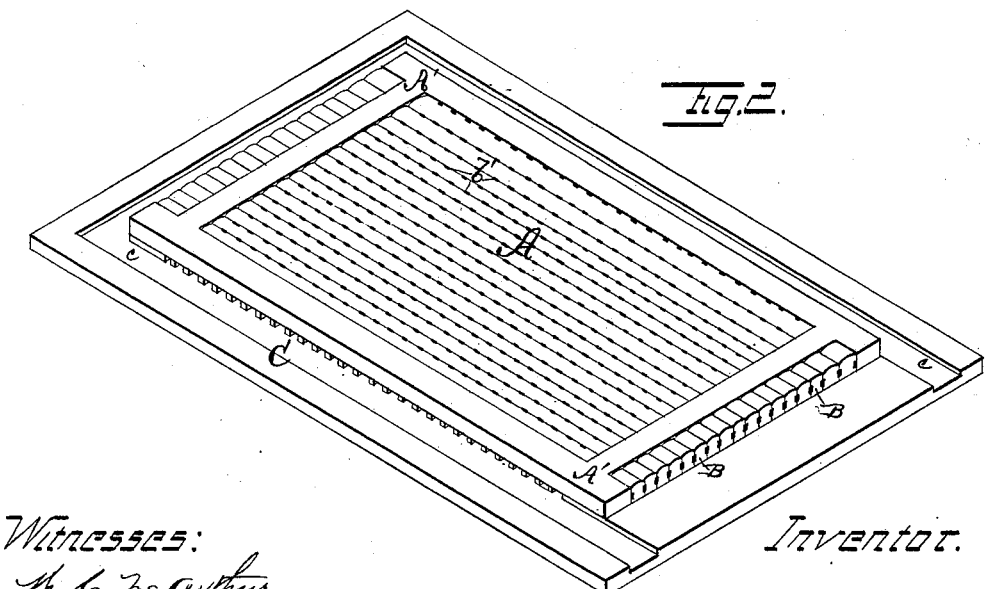
Witnesses:
H. C. McArthur
Paul Johnson
Inventor.
John C. Tiffany
per
H. Harrison
Attorney

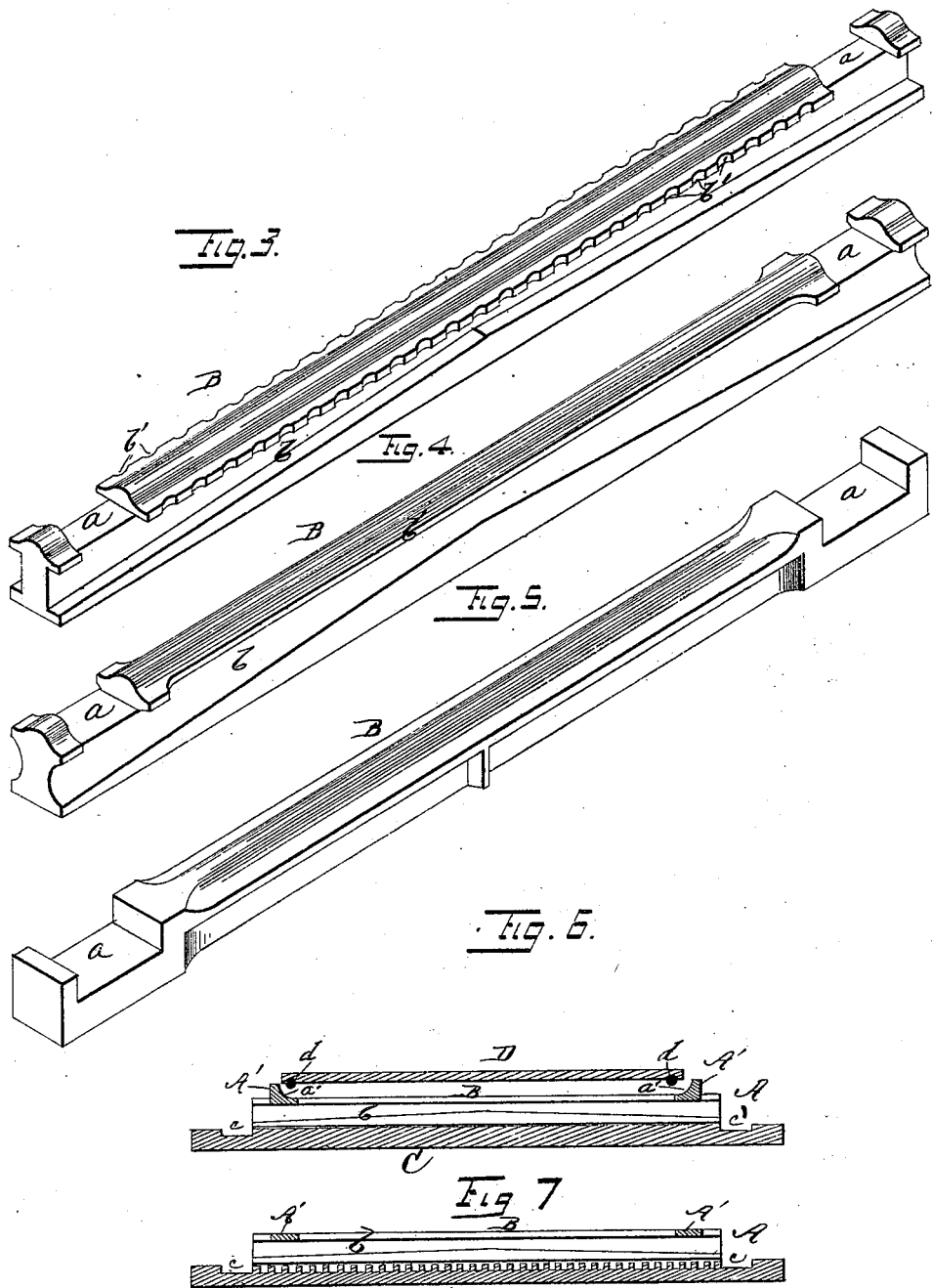

UNITED STATES PATENT OFFICE.

JOHN C. TIFFANY, OF XENIA, OHIO.

DIVISION-MAT FOR OIL-PRESSES.

SPECIFICATION forming part of Letters Patent No. 275,961, dated April 17, 1883.

Application filed December 1, 1882. (No model.)

*To all whom it may concern:*

Be it known that I, JOHN C. TIFFANY, a citizen of the United States of America, residing at Xenia, in the county of Greene and State of Ohio, have invented certain new and useful Improvements in Division-Mats for Oil-Presses, of which the following is a specification.

This invention relates to improvements in division-mats for oil-presses; and it consists in a mat formed of a series of bars secured side by side in a suitable frame, and provided or formed with horizontal side grooves, to which the oil expressed is conducted by a series of openings through the upper surface of the bars, substantially as will be hereinafter more fully described.

In order to enable others skilled in the art to which my invention appertains to make and use the same, I will now proceed to describe its construction and operation, referring to the annexed drawings, in which—

Figure 1 is a perspective view of my mat for pressing cotton-seed. Fig. 2 is a similar view of a modified form of mat. Figs. 3, 4, and 5 are perspective views enlarged of different shaped bars of which mats may be formed; and Figs. 6 and 7 are sections through two of these mats, showing their relative position when used in a press.

A represents a division-mat composed of parallel bars B B arranged side by side, and secured together by a frame, A'. The bars B B are each formed with a groove, $b$, in each side running from end to end of the bar, and these grooves are preferably made with their lower sides inclined from the center toward either end, as shown in Figs. 3 and 4, though they may be made horizontal, if desired. These grooves $b$ are also connected with the upper surface of the bars by notches $b'$, as shown, of any desired form; or the flange forming the upper surface of the groove may be cut away to form a long opening, as seen by Fig. 4. Near each end the bars are formed with notches $a$ for the reception of the frame A', which in Fig. 2 is shown as flush with the upper surface of the bars; but in Fig. 1, which is arranged for pressing cotton-seed, this frame projects above the bars a short distance to form a shallow box open at one end, and having its inner sides concave, as seen at $a'$, to facilitate the downflow of the oil, and more closely fit the form of the edge of the oil-cake. This mat is arranged upon a solid base or plate, C, having a circumferential groove, $c$, around the mat A, and opening outward at one end of the plate, as shown. Under the mat A the plate C may be made a plain flat surface, as shown by Figs. 1 and 6, according to the kind of bars B used in forming the mat. These division-plates being properly arranged in a press, the "oil-cake" is formed in the usual way and placed upon the mats A. In pressing cotton-seed, I use, in connection with the mat shown in Fig. 1, a ram-plate, D, as shown in Fig. 6, having around its outer edge on the under surface a groove, in which is secured a rope, $d$, of matting or hair, which ram-plate during the expression of the oil fits within the box or frame A', and the rope $d$ prevents the overflow of the oil, which passes down through the notches $b'$ $b'$ to the groove or channel $b$, and thence out to the depression or groove $c$ in the plate C, from which it is drawn off, as usual. The oil passing down into the channel $b$ as soon as expressed is not drawn up again when the pressure is removed, and for this reason obtains more oil from the material under operation, and leaves that material in a much drier and more marketable shape after pressing.

The ram-plate in some cases may be made with a corrugated surface, and the tops of the bars may be flat, round, or oval, as may be desired, though I have shown them oval in the drawings.

Having thus fully described my invention, what I claim as new, and desire to secure by Letters Patent, is—

1. A division-mat for oil-presses, formed of bars placed side by side, and provided with openings between them or in their adjacent sides, through which the oil may pass to the plate beneath, substantially as and for the purpose set forth.

2. A division-mat for oil-presses, formed of bars placed side by side, each bar having its sides provided with a channel with open ends, and one or more openings or notches communicating with the upper surface of the bars, substantially as and for the purpose set forth.

3. A division-mat for oil-presses, formed of bars arranged parallel to and impinging against each other, each bar being formed with a side channel communicating with its upper surface, and inclined from the center toward each end, substantially as described and shown.

4. A division-mat for oil-presses, formed of parallel bars, channeled as described, and held together by a frame secured to or mortised into the bars, said frame projecting above the mat on three sides and concaved upon its inner sides, substantially as and for the purpose set forth.

5. A division-mat for oil-presses, formed of parallel bars with channel sides secured in a frame upon a solid base-plate, provided with a depression or groove around the bars for the reception of the oil, substantially as shown and described.

6. The division-mat for oil-presses herein described, consisting essentially of a number of bars having channel sides with openings communicating with the upper surface of the bars, and confined in a frame or box upon a solid channeled or grooved base-plate, in combination with a ram-plate provided with a groove around its edges, in which is secured a matting or hair rope, substantially as and for the purpose set forth.

In testimony whereof I affix my signature in presence of two witnesses.

JOHN C. TIFFANY.

Witnesses:
D. B. TIFFANY,
H. W. QUISTON.